Aug. 11, 1925.
L. PRAEG
1,549,380
MEANS FOR FLUTING MILLING ROLLS AND THE LIKE
Filed July 31, 1922  2 Sheets-Sheet 1
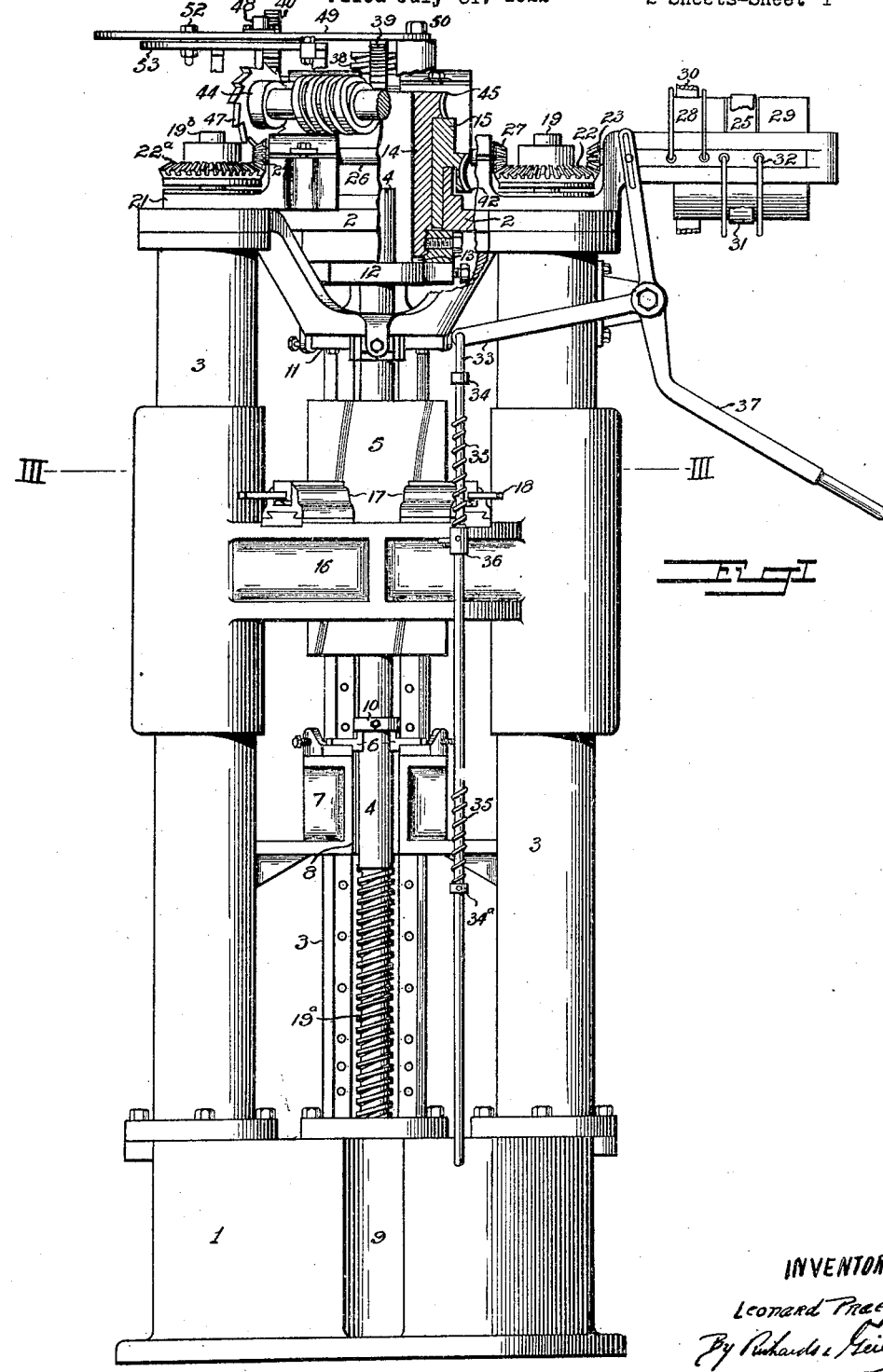
INVENTOR:
Leonard Praeg
By Richards & Geier
Attys.

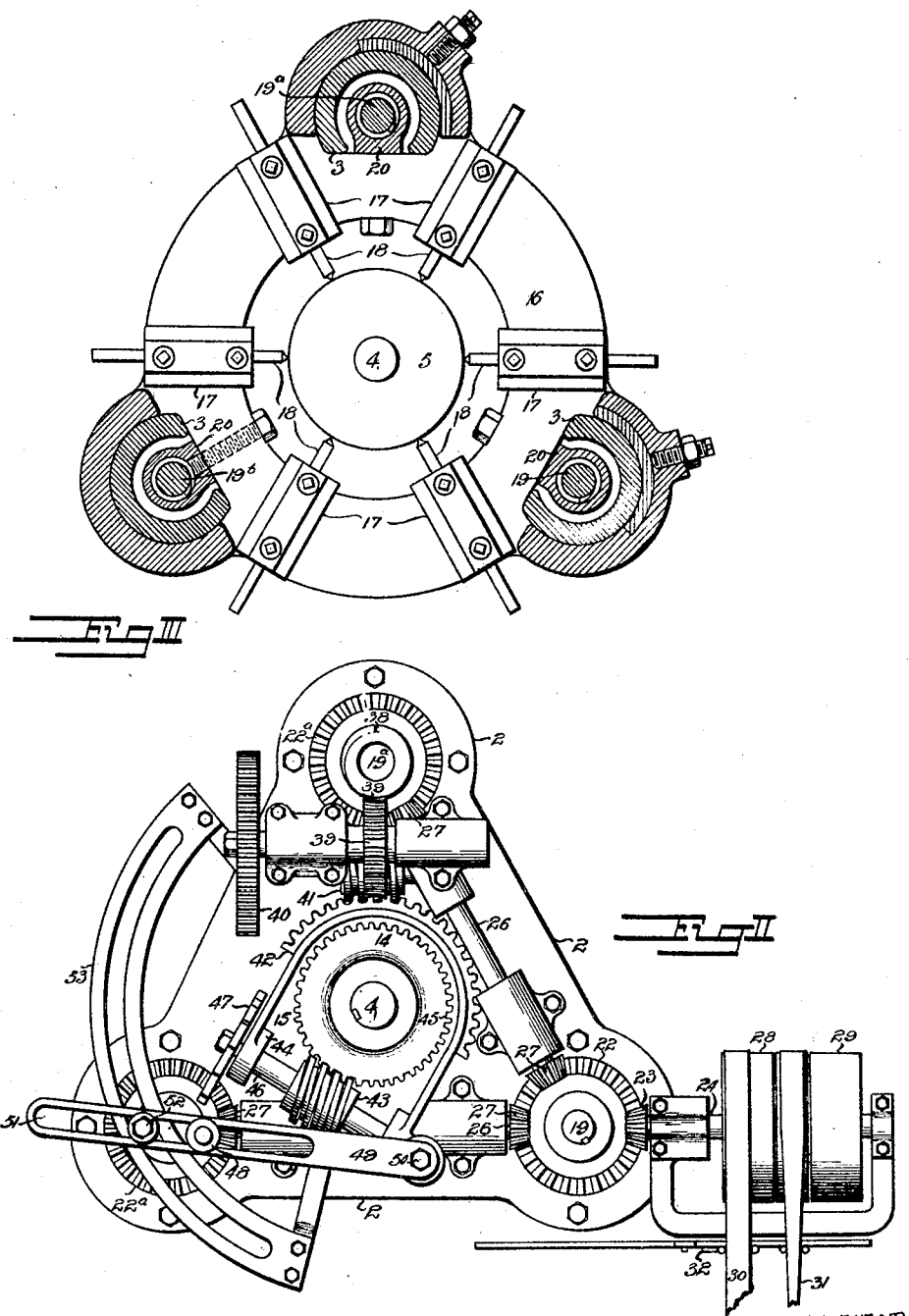

Patented Aug. 11, 1925.

1,549,380

UNITED STATES PATENT OFFICE.

LEONARD PRAEG, OF JOHANNESBURG, TRANSVAAL, SOUTH AFRICA.

MEANS FOR FLUTING MILLING ROLLS AND THE LIKE.

Application filed July 31, 1922. Serial No. 578,578.

*To all whom it may concern:*

Be it known that LEONARD PRAEG, a British subject, residing at corner of Smal and Albert Streets, Johannesburg, Transvaal Province, Union of South Africa, has invented certain new and useful Improvements in Means for Fluting Milling Rolls and the like, of which the following is a specification The present invention has reference to apparatus for fluting the surface of chilled iron milling rolls and like articles; the object of the invention being to construct a machine which enables the fluting to be effected more rapidly than hertofore. Owing to the hardness of the metal due to the chill, the speed of cutting is limited; and accordingly a particular object is so to arrange the machine that a greater number of cutting tools may be used simultaneously than has hitherto been practicable, and thus reduce the time required to complete a roll.

The invention is illustrated in the accompanying drawings in which—

Fig. I is an elevation of the machine,

Fig. II is a plan thereof showing the top gears.

Fig. III is a sectional plan on the plane III—III Fig. I showing the saddle.

The machine shown comprises a heavy base 1 and a head 2 supported from the base by means of rigid columns 3 spaced around the axis of the machine. There are preferably three columns in order to provide the greatest rigidity whilst occupying the least space.

The spindle 4 of the milling roll 5 which is being operated on, is rotatably mounted at its lower end in a steady rest having adjustable jaws 6 for centering the roll. Said rest is carried by a casting 7 which is bolted to the columns 3 and can be fixed at different heights thereon to accommodate rolls of different lengths. A side gap 8 is left in the casting to facilitate the insertion of the roll; and a similar gap 9 in the base permits an extra long roll to be accommodated. A collar 10 which is clamped on the spindle 4 bears on the jaws 6 to prevent the roll from slipping down.

The upper end of the roll spindle is centred by a similar adjustable steady rest 11 depending from the head 2. A driving dog 12 clamped to the roll spindle seats in a recess 13 in the chuck 14. Said chuck is rotatable in the sleeve 15 which, in turn, is rotatable in the head 2.

16 indicates an annular saddle which surrounds the roll and carries the boxes 17 for the cutting tools 18. Said saddle is mounted on the columns 3 to slide up and down the same. It is thus caused to move by means of the rotatable driving screws 19, 19$^a$, 19$^b$ which engage nuts 20 fixed to the saddle. The driving screws are supported in thrust bearings 21 and bevel wheels 22, 22$^a$ are secured to their ends. The bevel wheel 22 is driven by the pinion 23 fixed to the shaft 24 on which is also secured the belt pulley 25. The bevel wheels 22$^a$ are driven from the wheel 22 by the shafts 26 and pinions 27.

The belt pulley 25 forms part of a usual belt-driven reversing gear comprising also the loose pulleys 28, 29; the open and crossed belts 30, 31; the belt shifting forks 32; and the striking gear 33, 34, 34$^a$. Said mechanism automatically effects repeated up and down movement of the saddle 16, with a slow upward movement during which the flutes are cut by the tools 18, and a rapid idle return. The limits of the working stroke are adjusted by altering the positions of the tappets 34, 34$^a$ which are acted on, through the compression springs 35 by the dog 36 on the saddle. The striking gear is fitted with a hand lever 37 for manually controlling the machine.

The helical form of the flutes is produced in the usual manner by appropriately rotating the roll as the saddle reciprocates. For this purpose, a worm 38 on the feed screw 19$^a$ drives a worm wheel 39 which, through gearing 40, drives a worm 41 engaging with a worm quadrant 42 on the sleeve 15.

The step by step rotational feed of the roll to bring the same into position for successive cuts is effected by a worm 43 mounted in bearings 44 on the sleeve 15 and engaging a worm wheel 45 on the chuck 14. On the worm shaft 46 is the ratchet wheel 47. Said wheel engages periodically with a pawl 48 mounted on a bar 49 which is pivoted at its end 50 to the sleeve 15. The other end of said bar is slotted at 51 to slide over a pin 52 which is adjustably secured to a quadrant 53 bolted to the head 2. Owing to the reciprocating movement of the sleeve 15 the pawl 48 periodically engages the ratchet wheel 47 to rotate the same one tooth or more, accordingly as the ratchet is set to cut finer or coarser flutes.

The means shown for thus oscillating the roll and feeding the same step by step are similar to those usually fitted to roll fluting machines, modified to suit the vertical arrangement of the machine.

The operation is as follows. The roll is first centred in the steady rests 6 and 11 so that it can rotate therein without play; and the rod spindle is clamped by the driving dog 12. The cutting tools 18 having been set, the crossed belt 31 is thrown onto the fast pulley 25. The driving screws 19, 19$^a$ and 19$^b$ are thereby rotated and the saddle 16 rises on the working stroke. During said stroke the sleeve 15 is rotated by the gearing 38, 39, 40, 41, 42 sufficiently to make the cuts helical to the required extent. Upon the tools passing off the upper end of the roll the dog 36 strikes the tappet 34 and brings the open belt 30 onto the fast pulley 25 whereby all the motions are reversed, so that the carriage is returned to its lowermost position and the roll is rotated backwards. During the backward turning movement the pawl 48 rotates the ratchet wheel 47 and the roll is fed forward the angular distance corresponding to the width of one flute. The dog 36 strikes the tappet 34$^a$ and brings the crossed belt 31 again onto the fast pulley 25; whereupon the next cut is made in the same manner.

Owing to the six cuts being made simultaneously, the roll has to be fed through 60 degrees only instead of through a full circle as is usual; and the time occupied in cutting the flutes is correspondingly decreased without departing from the recognized driving speed for chilled cast iron. Each cutting tool is readily accessible at all times so that, notwithstanding their increasing number, the time required to set the cuts is not much greater than in the present single tool horizontal machines.

I claim:

1. In a roll fluting machine, the combination of a base, a number of columns thereon, a head carried by the columns, a rotatable sleeve in the head, means to rotate the sleeve back and forth to produce a helical disposition of the flutes on the roll, a rotatable chuck in the sleeve, means in the chuck member adapted to secure the upper end of a roll spindle, an adjustable bearing support for the lower end of the said spindle, an annular saddle relatively sliding on the columns, a plurality of tool boxes on the saddle, means for relatively reciprocating the saddle and means for angularly feeding the roll step by step.

2. In a roll fluting machine, the combination of a framework arranged to hold a roll with its axis vertical, an annular tool saddle relatively reciprocable vertically on the framework, a plurality of tool boxes arranged on the saddle for upward cutting, a plurality of feed screws supported in the upper part of the framework and engaging the saddle for traversing the same up and down the framework, means for rotating the feed screws in opposite directions alternately, and means for rotating the roll.

3. In a roll fluting machine, the combination of a framework, means on the framework for holding a roll with its axis vertical, said means being radially adjustable for centering the roll, an annular tool saddle relatively reciprocable vertically on the framework, and adapted to carry a number of tools for operating simultaneously on the roll, means for relatively reciprocating the saddle and means for rotating the roll.

In testimony whereof I affix my signature.

LEONARD PRAEG.